United States Patent
Nelson et al.

(10) Patent No.: US 10,165,313 B1
(45) Date of Patent: *Dec. 25, 2018

(54) TESTING SET TOP APPLIANCE BOXES

(71) Applicant: Google LLC, Mountain View, CA (US)

(72) Inventors: Brandon Nelson, New York, NY (US); Robert Russell Amos, New York City, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,198

(22) Filed: Apr. 19, 2017

Related U.S. Application Data

(63) Continuation of application No. 14/862,575, filed on Sep. 23, 2015, now Pat. No. 9,661,362.

(51) Int. Cl.
*H04N 21/24* (2011.01)
*H04N 17/04* (2006.01)
(Continued)

(52) U.S. Cl.
CPC ............ *H04N 21/24* (2013.01); *H04N 17/04* (2013.01); *H04N 21/443* (2013.01); *H04N 21/64738* (2013.01); *H04N 21/8173* (2013.01)

(58) Field of Classification Search
CPC ............ H04N 21/443; H04N 21/8168; H04N 21/8173; H04N 21/818; H04N 21/8186;
(Continued)

(56) References Cited

U.S. PATENT DOCUMENTS 6,408,335 B1    6/2002   Schwaller
6,625,648 B1    9/2003   Schwaller
(Continued)

OTHER PUBLICATIONS

"Digital media player," From Wikipedia, the free encyclopedia, last modified on Sep. 19, 2015 [retrieved on Sep. 23, 2015]. Retrieved from the Internet: URL<https://en.wikipedia.org/wiki/Digital_media_player>, 5 pages.

(Continued)

*Primary Examiner* — Brian T Pendleton
*Assistant Examiner* — Frank Johnson
(74) *Attorney, Agent, or Firm* — Fish & Richardson P.C.

(57) ABSTRACT

Methods, systems, and apparatus include computer programs encoded on a computer-readable storage medium for testing set-top boxes. A method includes: receiving an application for testing in a set-top box environment; identifying a set-top box for testing the application; executing the application on the set-top box, including commanding the set-top box to display a plurality of interfaces and initiating commands to transition the set-top box from a first presentation state to a second presentation state; capturing video output associated with the first presentation state; capturing video output associated with the set-top box after the transition to the second presentation state; monitoring and recording network traffic output by the set-top box; and providing an output associated with the monitoring and the captured video output to enable correlation between commands executed as part of the application execution, on screen output and network traffic of the set-top box.

20 Claims, 6 Drawing Sheets

(51) Int. Cl.
*H04N 21/647* (2011.01)
*H04N 21/443* (2011.01)
*H04N 21/81* (2011.01)

(58) Field of Classification Search
CPC ...... H04N 17/04; H04N 17/045; H04N 21/24; H04N 21/64738
See application file for complete search history.

(56) References Cited

U.S. PATENT DOCUMENTS

| | | | |
|---|---|---|---|
| 8,255,536 | B2 | 8/2012 | Chen |
| 8,587,630 | B1 | 11/2013 | Krinsky et al. |
| 8,996,742 | B1 | 3/2015 | Spinner et al. |
| 2009/0198484 | A1 | 8/2009 | Christensen et al. |
| 2012/0140081 | A1 | 6/2012 | Clements |
| 2013/0185761 | A1 | 7/2013 | Friel et al. |
| 2013/0312020 | A1 | 11/2013 | Talbert |
| 2014/0181849 | A1 | 6/2014 | Casey et al. |
| 2015/0002680 | A1 | 1/2015 | Amidei et al. |
| 2015/0341812 | A1 | 11/2015 | Dion et al. |
| 2017/0188023 | A1* | 6/2017 | Brabenac ............... H04N 17/02 |
| 2017/0366845 | A1* | 12/2017 | Friel ...................... H04H 60/32 |

OTHER PUBLICATIONS

"Set-top box," From Wikipedia, the free encyclopedia, last modified on Sep. 10, 2015 [retrieved on Sep. 23, 2015]. Retrieved from the Internet: URL<https://en.wikipedia.org/wiki/Set-top_box>, 4 pages.

"Software testing," From Wikipedia, the free encyclopedia, last modified on Sep. 22, 2015 [retrieved on Sep. 23, 2015]. Retrieved from the Internet: URL<https://en.wikipedia.org/wiki/Software_testing>, 23 pages.

Kovacevic et al., "System for automatic testing of Android based digital TV receivers," X International Symposium on Industrial Electronics INDEL 2014, Banja Luka, Nov. 2014, pp. 189-192.

* cited by examiner

TESTING SET TOP APPLIANCE BOXES

CROSS-REFERENCE TO RELATED APPLICATIONS

This application is a continuation application of and claims priority to U.S. application Ser. No. 14/862,575, filed on Sep. 23, 2015, the entire contents of which are hereby incorporated by reference.

BACKGROUND

This specification relates to testing set top appliance boxes.

A set-top box can display output to a television screen or to another display device. The set-top box can receive a source signal and can display content based on the source signal on the display device. The set-top box can display an interactive application on the display device. A user can interact with the interactive application, such as with a remote control device. The set-top box can execute the application, receive user input, and display particular user interfaces on the display device based on the received user input.

SUMMARY

In general, one innovative aspect of the subject matter described in this specification can be implemented in methods that include a method for testing set top appliance boxes. A method includes: receiving an application for testing in a set top appliance box environment; identifying a first set top appliance box from among a plurality of different set top appliance boxes for testing the application; executing the application on the first set top appliance box, including, as part of the executing, commanding the first set top appliance box to display a plurality of interfaces and initiating commands to transition the first set top appliance box from a first presentation state to a second, different presentation state; capturing video output associated with the first presentation state; capturing video output associated with the first set top appliance box after the transition to the second different presentation state; monitoring and recording, as part of the executing, network traffic output by the first set top appliance box in association with the execution of the application before, during, and after the transition from the first presentation state to the second presentation state; and providing an output associated with the monitoring and the captured video output associated with the first and second presentation states to enable correlation between commands executed as part of the application execution, on screen output and network traffic of the first set top appliance box.

In general, another aspect of the subject matter described in this specification can be implemented in computer program products. A computer program product is tangibly embodied in a computer-readable storage device and comprises instructions. The instructions, when executed by a processor, cause the processor to: receive an application for testing in a set top appliance box environment; identify a first set top appliance box from among a plurality of different set top appliance boxes for testing the application; execute the application on the first set top appliance box, including, as part of the executing, commanding the first set top appliance box to display a plurality of interfaces and initiating commands to transition the first set top appliance box from a first presentation state to a second, different presentation state; capture video output associated with the first presentation state; capture video output associated with the first set top appliance box after the transition to the second different presentation state; monitor and record, as part of the executing, network traffic output by the first set top appliance box in association with the execution of the application before, during, and after the transition from the first presentation state to the second presentation state; and provide an output associated with the monitoring and the captured video output associated with the first and second presentation states to enable correlation between commands executed as part of the application execution, on screen output and network traffic of the first set top appliance box.

In general, another aspect of the subject matter described in this specification can be implemented in an apparatus. An apparatus includes a test controller, a first set top appliance box, a harness, a video recorder, a proxy, and a log. The test controller can receive an application for testing in a set top appliance box environment, identify the first set top appliance box from among a plurality of different set top appliance boxes for testing the application, and execute the application on the particular set top appliance box in accordance with a test program. The first set top appliance box can be operable to execute the application, receive commands associated with portions of the test program, provide different presentation environments associated with the execution of the application in accordance with the test program, and provide network traffic based on actions performed and commands received at the first test top appliance box. The harness can be coupled to both the test controller and the first set top appliance box and can be operable to receive commands from the test controller for controlling the first set top appliance box. The harness can be operable to receive commands associated with the execution of the test program by the test controller and to generate infrared or radio frequency commands for causing the first set top appliance box to display a plurality of interfaces and initiating commands to transition the first set top appliance box from a first presentation state to a second different presentation state. The video recorder can be coupled to the first test top appliance box and the harness and can be operable to capture video output of the first test top appliance box responsive to commands received from the harness including capturing video output associated with the first and second different presentation states. The proxy and the log can monitor and store network traffic output by the first set top appliance box in association with the execution of the application before, during, and after the transition from the first presentation state to the second presentation state. The test controller can provide an output associated with the monitoring and the captured video output associated with the first and second presentation states to enable correlation between commands executed as part of the application execution, on screen output and network traffic of the first set top appliance box.

These and other implementations can each optionally include one or more of the following features. The set top appliance boxes can include a streaming media player. Expected video output for the first set top appliance box can be correlated with captured video output associated with the first set top appliance box including the identifying of differences over the expected output and reporting the differences. Expected network traffic can be correlated with recorded network traffic including the identifying of differences over the expected network traffic. Commanding can include providing infrared or radio frequency commands to the first set top appliance box to transition from the first presentation state to the second different presentation state. Executing can include receiving a test program associated with the application and interpreting commands included in the test program into infrared or radio frequency commands that are transmitted to the first test top appliance box for transitioning from the first presentation state to the second different presentation state. The test program can be interpreted and instructions included in the test program can be executed to test the first set top appliance box during operation in the first and second different presentation states. The first presentation state can be characterized by an on screen menu and executing the application can include executing instructions to cause a transition from the first presentation state including selection of an item from the menu to the second different presentation state. The second presentation state can be characterized by the playing of video content responsive to the selection of the item from the menu.

Particular implementations may realize none, one or more of the following advantages. Automatic testing of an application that is executed in association with a set top appliance box can be performed. Video output captured during execution of the application can be correlated to network traffic captured during execution of the application. A test program associated with the execution of the application on a set-top appliance box can be run on multiple, different types of set top appliance boxes, enabling testing of the application on plural different appliance boxes or platforms, such as prior to provisioning of the application for use with a given set top appliance box.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A testing system can execute a test program which tests an application running on a set top appliance box. The testing system can, for example, capture video output and network traffic generated by the set top appliance box when the application is executed on the set top appliance box. The video output can correspond to one or more presentation states of the application. The test program can include commands to determine whether particular video output of the application correctly corresponds to particular network traffic generated by the application. The test program can generate an output which indicates an outcome of the test.

Figure 1:
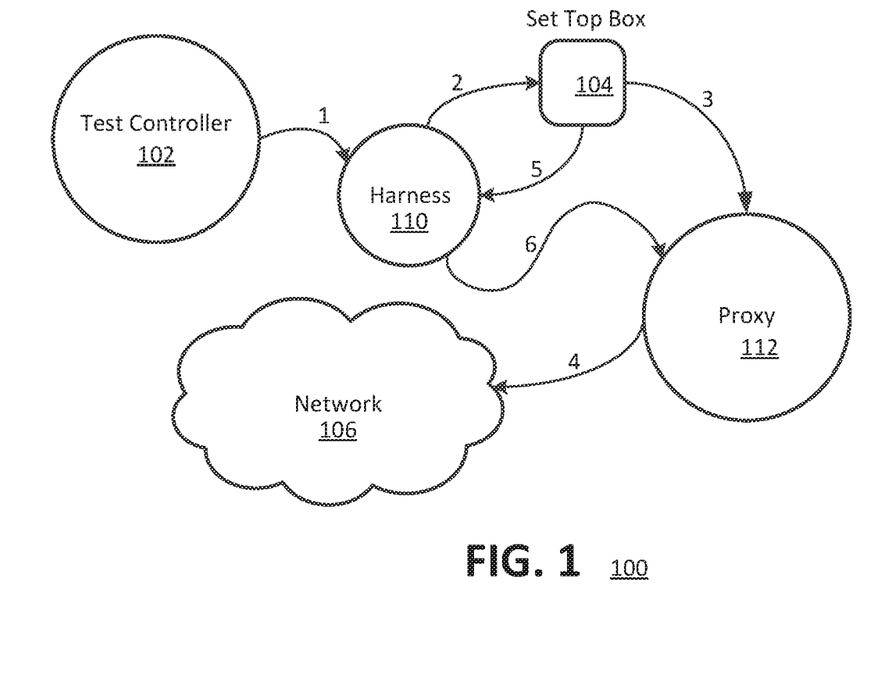
FIG. 1 is a block diagram of an example system for testing a set top appliance box application.

FIG. 1 is a block diagram of an example system 100 for testing a set top appliance box application. The system 100 includes a test controller 102, a set top appliance box 104, and a network 106. The test controller 102 receives the application to be tested and a test program for testing the application (e.g., from a developer, a tester, an administrator, a support person, etc.). The test controller 102 can return control of the set top appliance box 104 to the test program. The test controller 102 can identify the set top appliance box 104 for execution of the test program. The test program can include a control portion which automatically controls the set top appliance box 104 and an evaluation portion which tests output generated by the application (e.g., video output, network traffic) to test the functionality of the application.

The test controller 102 can automatically execute the test program, as well as potentially other test programs, as part of automatic regression testing of the application, to verify functionality of the application. Automatic regression testing can be more efficient and more accurate than, for example, manual testing. The system 100 can also be used, for example, by a developer for testing a pre-release version of the application. As another example, the system 100 can be used by a support person, to debug or reproduce an issue experienced by an end user on an end user set top appliance box of the same type as the set top appliance box 104.

The set top appliance box 104 is operable to execute the application in the system 100. The set top appliance box 104 can be consumer grade and the test controller 102 can be configured to test the application on the set top appliance box 104 in a manner which emulates the actions of an end user. The set top appliance box 104 can, while executing the application, receive commands associated with the control portion of the test program to control the application. The set top appliance box 104 can display various presentation states associated with the execution of the application and can generate network traffic based on actions performed and commands received at the set top appliance box 104.

The test program can include an evaluation portion which can operate to determine whether particular video output generated by the set top appliance box 104 corresponds to particular network traffic generated by the set top appliance box 104. The evaluation portion of the test program can generate an output which indicates an outcome of the test. The output of the test can be displayed, for example, in a user interface associated with the test controller 102. The user interface can provide a front-end for the system 100.

As indicated by a first arrow (e.g., arrow "1"), the test controller 102 can, as part of executing the test program, identify a harness process 110 (e.g., from a pool of harness processes), establish a connection with the harness process 110, and forward the application and test program instructions to the harness process 110. The test controller 102 can manage execution of test programs, including collecting, aggregating, and reporting test results.

The harness process 110 is configured to control the set top appliance box 104. For example and as illustrated by a second arrow, the harness process 110 can interface with one or more hardware devices to cause infrared, radio frequency, or other commands to be sent to the set top appliance box 104 which can, for example, cause the set top appliance box 104 to display a plurality of interfaces during execution of the application. The harness process 110 is described in more detail below with respect to FIG. 2. In some implementations, the test controller 102 can assign a test session to a specific harness such as the harness 110 and can act as a liaison between the test session and the harness 110

The set top appliance box 104 can generate network traffic during execution of the application. For example and as illustrated by a third arrow, the set top appliance box 104 can generate a network request in association with the user interacting with the application, or in association with the application executing specific instructions as part of its native functionality. The network request generated by the set top appliance box 104 can be transparently forwarded to a proxy 112. The proxy 112 can log the network request and forward the network request to the network 106 (e.g., as illustrated by a fourth arrow). The proxy 112 can record a network response and forward the network response to the set top appliance box 104.

As mentioned above and as discussed in more detail below, the test program can include an evaluation portion which correlates network traffic with captured video output to determine whether a test result is successful. For example and as illustrated by a fifth arrow, the harness process 110 can interface with a video controller which captures video output produced during execution of the application. As another example and as illustrated by a sixth arrow, the harness process 110 can send a request to the proxy 112 for logged network traffic. The control portion of the test program can direct the harness process 110 to capture video and/or request captured network traffic from the proxy 112, for example. The evaluation portion of the test program can determine whether the captured video output correctly correlates with the network traffic. Other types of tests can be performed, as described below.

As an example, the captured video output can include video output associated with a first presentation state of the application and video output associated with the set top box after a transition to a second, different presentation state of the application, e.g., as a result of execution of a command to interact with the application executing on the set top appliance box 104. Network traffic associated with (e.g., output by, received by) the application's execution on the set top appliance box 104 before, during, and after the transition from the first presentation state to the second presentation state can be monitored and recorded. The captured video output corresponding to the first and second presentation states can be correlated, by the evaluation portion of the test program, with the network traffic that occurred before, during, and after the transition to the second presentation state. As another example, expected video output for the set top appliance box 104 can be correlated, by the evaluation portion, with captured video output associated with the set top appliance box 104, such as to determine whether the expected video output matches the captured video output. Similarly, expected network traffic for the application executing on the set top appliance box 104 can be correlated, by the evaluation portion, with captured network traffic associated with the application executing on the set top appliance box 104, such as to determine whether the expected network traffic matches the captured network traffic. Testing expected vs. recorded video output and/or expected vs. recorded network traffic can be included as part of control flow for a test program. A test program can fail, for example, if expected video output and/or expected network traffic is not detected.

As a more specific example, suppose that a change has been made to the application to include a top menu and that the top menu includes a menu item which allows for selection of a video content item to be played. Upon selection of the menu item, the top menu should disappear and playback of the video content item should begin. The application can be written to include network traffic as an output which communicates information regarding various states of the application. For example, the application can include network traffic which asserts that the top menu has been displayed, that a menu item in the top menu has been selected, that the top menu has been hidden, and that playback of a selected video content item has begun. The control portion of the test program can be written, for example, to control the application to select a menu item on the top menu to play a particular video content item. The evaluation portion of the test program can compare captured video output to captured network traffic, to confirm whether the top menu was displayed and hidden when expected, and that playback of the video content item occurred as selected.

As another example, an application may include presentation of pre-video content (e.g., advertising) before presentation of a video content item. A skip button can be presented during presentation of the pre-video content. A test program can, for example: 1) test whether in fact a skip button was displayed on the screen 2) issue a command to the set top appliance box 104 to cause the skip button to be selected; 3) test whether the skip button was removed from the screen after being selected; 4) test whether the application presented the video content item after the skip button was selected; 5) correlate one or more of the above items with corresponding network traffic; or 6) analyze network traffic to test whether network traffic associated with billing a sponsor (e.g., advertiser) of the pre-video content item occurred based on the skipping of the pre-video content. In this example, control portions of the test program overlap with evaluation portions of the test program. As another example, a test program can include a control portion at the top of the test program and an evaluation portion at the end of the test program that does not overlap with the control portion.

Automated testing including automatic correlation can detect application issues that may be missed by manual testing. For example, timing issues can be detected. For example, execution of the test program can identify that a sponsor was billed for display of content prior to the content actually showing up for presentation on the end user device (e.g., the sponsor's content may in fact not have been shown, or the sponsor's content may have been skipped by the user before a presentation time threshold was reached).

Figure 2:
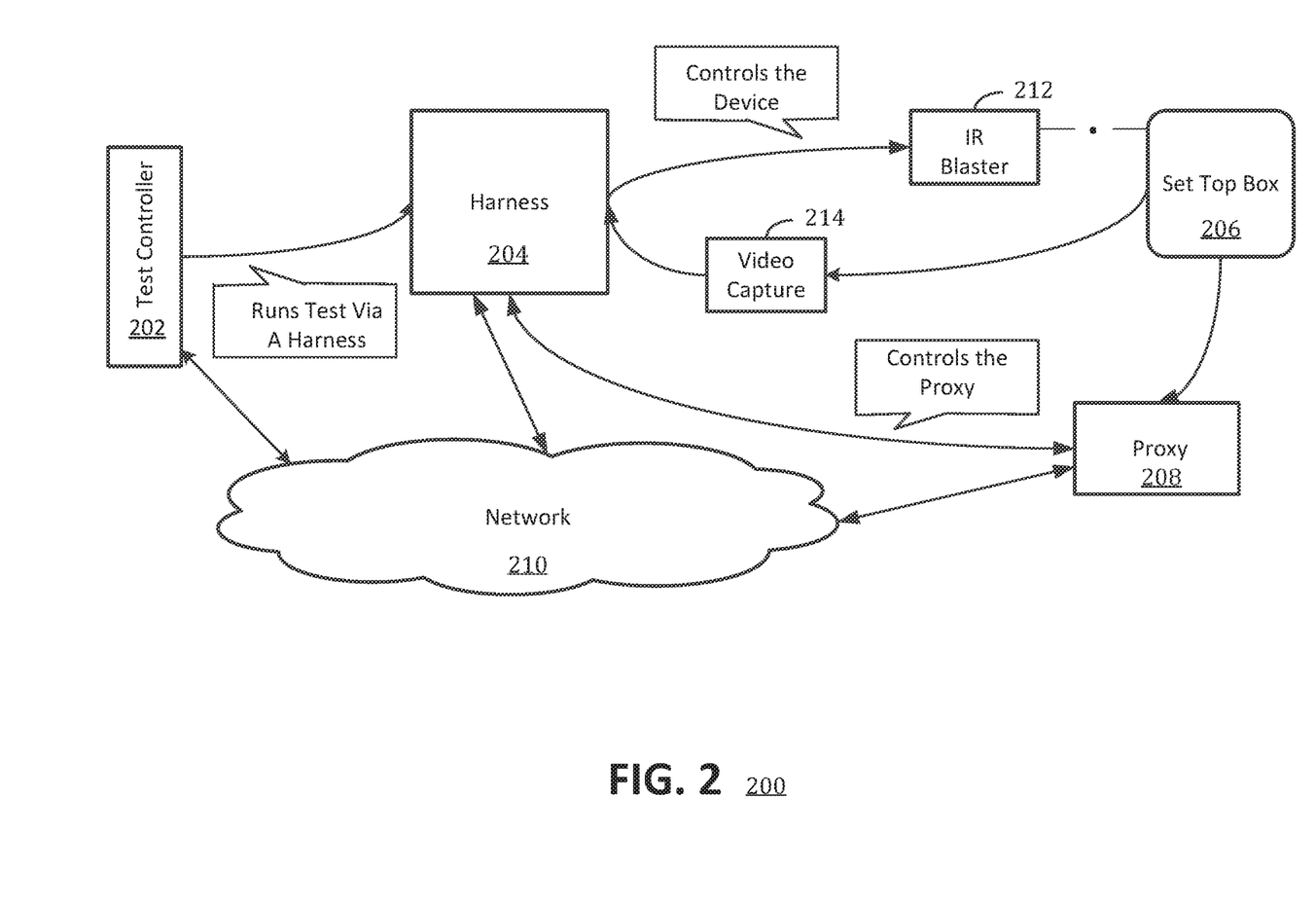
FIG. 2 is a block diagram of another example system for testing a set top appliance box application.

FIG. 2 is a block diagram of another example system 200 for testing an application executing on a set top appliance box. Similar to the system 100, the system 200 includes a test controller 202, a harness process 204, a set top appliance box 206, a proxy 208, and a network 210. The test controller 202 manages test programs, test execution and device configuration. The test controller 202 can collect and report test results.

The test controller 202 can, for example, receive from a user a test program and a request to execute the test program on a set top appliance box of a particular type. The test program can communicate and authenticate with the test controller, to establish a connection with the test controller 202. The test controller 202 can link the execution of a particular test program to a particular harness process, such as the harness process 204 and can establish a connection between the test program and the harness process 204. In some implementations, the test controller 202 executes the test program and forwards commands to the harness process 204.

The harness process 204 manages and communicates with various hardware devices which can be used to interface with the set top appliance box 204. For example, the harness process 204 can manage and communicate with an IR (Infrared) blaster device 212 and a video recorder 214. The harness process 204 can reside on the same computing device as the test controller 202 or can reside on a computing device other than the computing device that executes the test controller 202.

The harness process 204 can control the IR blaster device 212 to issue one or more IR commands that cause the set top appliance box 206 to display a plurality of interfaces. The IR blaster 212 is configured to send IR commands to the set top appliance box 206 (in response to received instructions from the test program via the harness). In some implementations, the IR blaster 212 emulates an infrared remote control and can send, for example, commands which emulate remote control key presses (e.g., enter, arrow commands) to the set top appliance box 206. Although an IR device is shown, the harness 204 can control, for example, a RF (Radio Frequency) emulator or another type of emulator. In some implementations, when a set top appliance box is not configured to accept IR commands, the harness process 204 can send commands to an adaptor which allows the set top appliance box to be controlled using IR commands. In some implementations, the test program sends commands (e.g., actual IR commands or other commands corresponding to the IR commands) to the harness 204 so that the harness 204 can process (as required) and forward the IR commands to the IR blaster device 212. In some implementations, the harness process 204 receives a generalized command from the test program and translates the generalized command to a specific IR command to send to the IR blaster device 212.

The harness process 204 can use the video recorder 214 to capture video output from the set top appliance box 206. Captured video can be used, for example, in a real-time test during execution of a test program and/or in post-test evaluation. Captured video can be compared to a golden (e.g., expected) image, for example. An evaluation portion of the test program can test whether an image that is equivalent to a golden image was displayed at an expected time. For example, a captured image frame corresponding to a certain time point of the application execution can be extracted from a frame buffer and compared to the golden image. In some implementations, a code (e.g., a QR (Quick Response) code), can be inserted into each video content frame associated with the application. The code for a given frame can indicate, for example, a content item and a particular frame number. When video from the application is captured, the codes in the captured frames can be used to determine whether appropriate video frames were displayed at expected times, and whether any expected video frames were skipped during presentation.

In some implementations, the test program controls the proxy 208. The proxy 208 can be used for the monitoring and recording of network traffic associated with the set top appliance box 206. For example, HTTP (HyperText Transfer Protocol) traffic (inbound and outbound) can be monitored and recorded. In some implementations, automatic updates and other configuration settings associated with the set top appliance box 206 are configured to reduce or eliminate non-application related traffic coming from the set top appliance box 206. In some implementations, the proxy 208 is a transparent proxy. In some implementations, the proxy 208 is a HTTPS (HTTP Secure) proxy and HTTPS traffic can be recorded. In some implementations, the harness 204 directs the proxy 208 to record network traffic, and the harness 204 returns the recorded network traffic to the test program.

Figure 3:
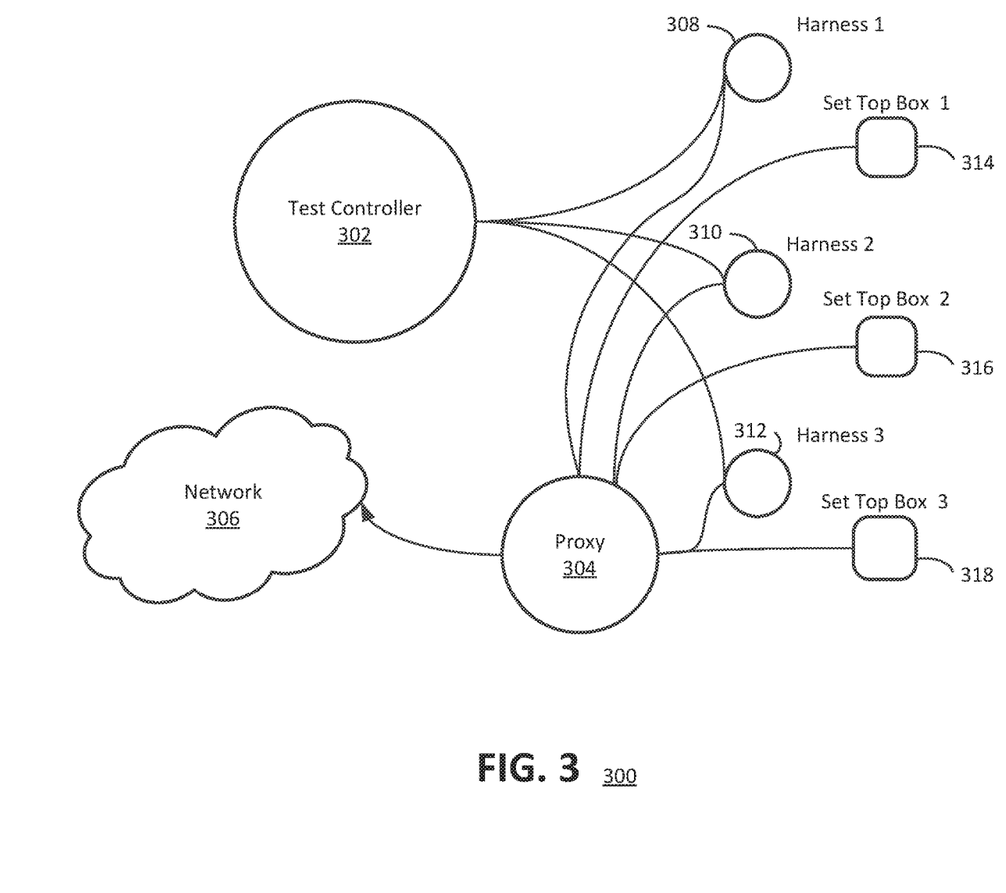
FIG. 3 is a block diagram of an example system for testing multiple set top appliance boxes.

FIG. 3 is a block diagram of an example system 300 for testing multiple set top appliance boxes. A developer may, for example, desire to test an application on multiple, different types of set top appliance boxes. For example, a set of test programs can each be run on multiple, different types of set top appliances boxes, such as each time a change is made to the application, to ensure that the application runs correctly on each of the types of set top appliance boxes.

The system 300 includes a test controller 302, a proxy 304, and a network 306. The test controller 302 is associated with first, second, and third harness processes 308, 310, and 312. The harness processes 308, 310, and 312 respectively control first, second, and third set top appliance boxes 314, 316, and 318. The harness processes 308, 310, and 312 can run on the same computing device as the proxy 304 or on a different computing device (and can all run on the same computing device or can run on separate computing devices). The proxy 304 can separately log network traffic associated with the set top appliance boxes 314, 316, and 318. Although three set top appliance boxes are shown, the system 300 can be configured to be scaled to include a larger number of set top appliance boxes and corresponding harness processes.

The test controller 302 can communicate with each of the harness processes 308, 310, and 312 using inter-process communication. For example, a RPC (Remote Procedure Call) or some other type of inter-process communication can be used. In some implementations, each harness process 308, 310, and 312 can use inter-process communication to communicate with the proxy 304. In some implementations, the test program uses inter-process communication to communicate with the proxy 304. A supervisor process can provide overall management of the test controller 302, the proxy 304, and the harness processes 308, 310, and 312. The supervisor process can provide alerting, restarting of processes, and log rotation, for example.

Each of the harnesses processes 308, 310, and 312 can register with the test controller 302. The test controller 302 can, for example, receive a test program and a request to execute the test program on a set top appliance box of a particular type. The test controller 302 can connect the test program to a respective, available harness process that is associated with a set top appliance box of the requested type. When the test program completes, the test controller 302 can disconnect the test program from the respective harness process and make the respective harness process available for future test program execution requests.

Figure 4:
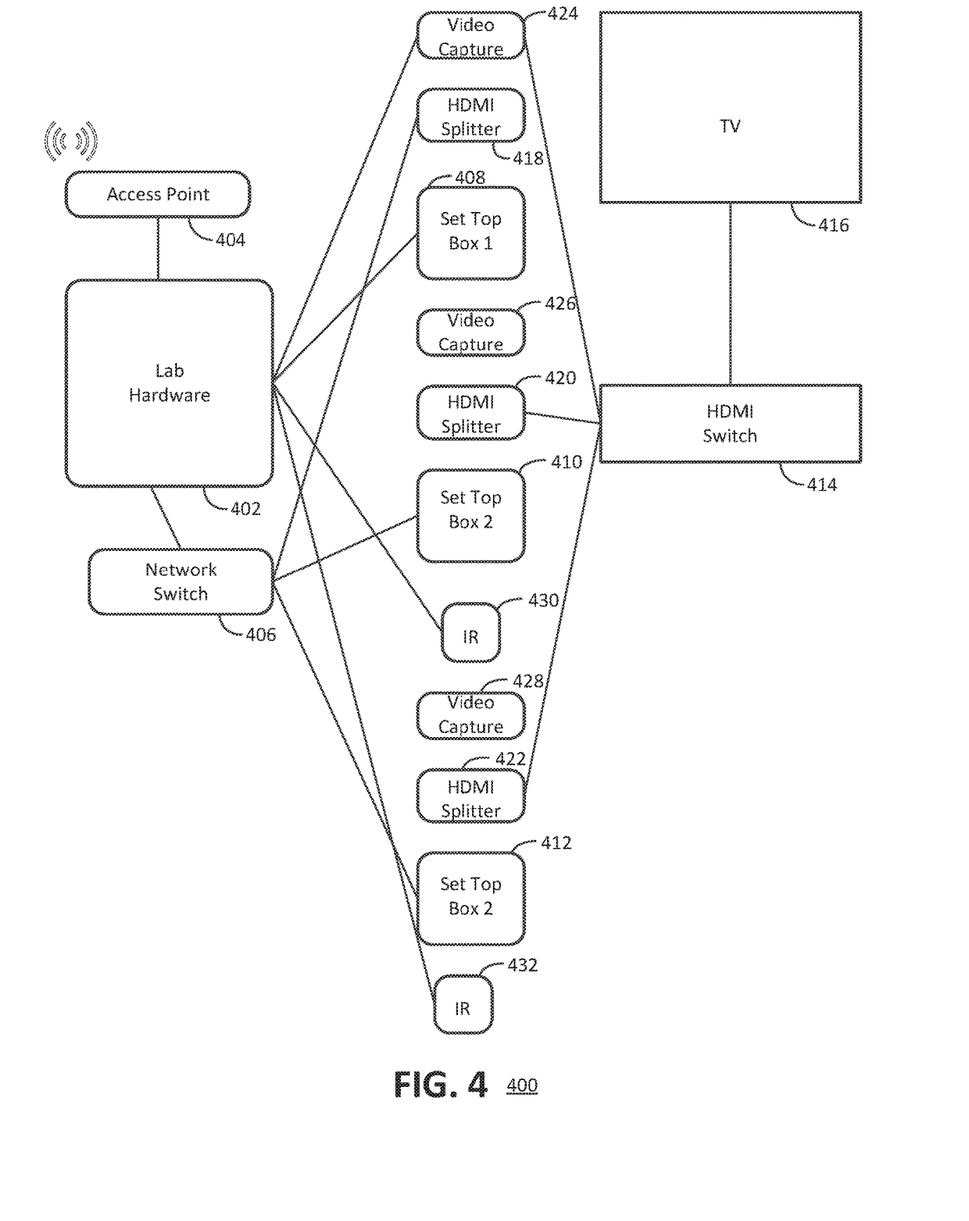
FIG. 4 is a block diagram of example system for testing set top appliance box applications.

FIG. 4 is a block diagram of example system 400 for testing set top appliance box applications. The system 400 includes various example hardware components, including lab hardware 402, an access point 404, a network switch 406, a first set top appliance box 408, a second set top appliance box 410, a third set top appliance box 412, and (optionally) a HDMI switch 414 and a television 416.

The lab hardware 402 is configured to run a test controller process, a proxy process, and a set of harness processes. For example, the lab hardware 402 can run a harness process for each of the set top appliance boxes 408, 410, and 412. The access point 404 can provide network access to the lab hardware 402 to one or more external networks (e.g., the Internet, a corporate network). The network switch 406 can be used to create a test network which is isolated from the external network(s). The lab hardware 402 can act as a router for the test network and can route network traffic occurring on the test network to an external network, such as the Internet.

The television 416 and the HDMI switch 414 can optionally be included in the system 100 to allow developers of the system to view live output from the set top appliance boxes 408, 410, and 412, such as for development and debugging purposes. The set top appliance boxes 408, 410, and 412 are respectively connected to HDMI splitters 418, 420, and 422. The HDMI splitters 418, 420, and 422 can be used to branch the video output from the set top appliance boxes 408, 410, and 412 to the television 416.

The set top appliance boxes 410, and 412 are respectively connected to IR devices 430 and 432. The IR devices 430 and 432 can send IR commands to the set top appliance boxes 410 and 412, respectively. The set top appliance box 408 is not connected to an IR device. For example, the set top appliance box 408 may be controlled through other means, such as an adapter (not shown).

Figure 5:
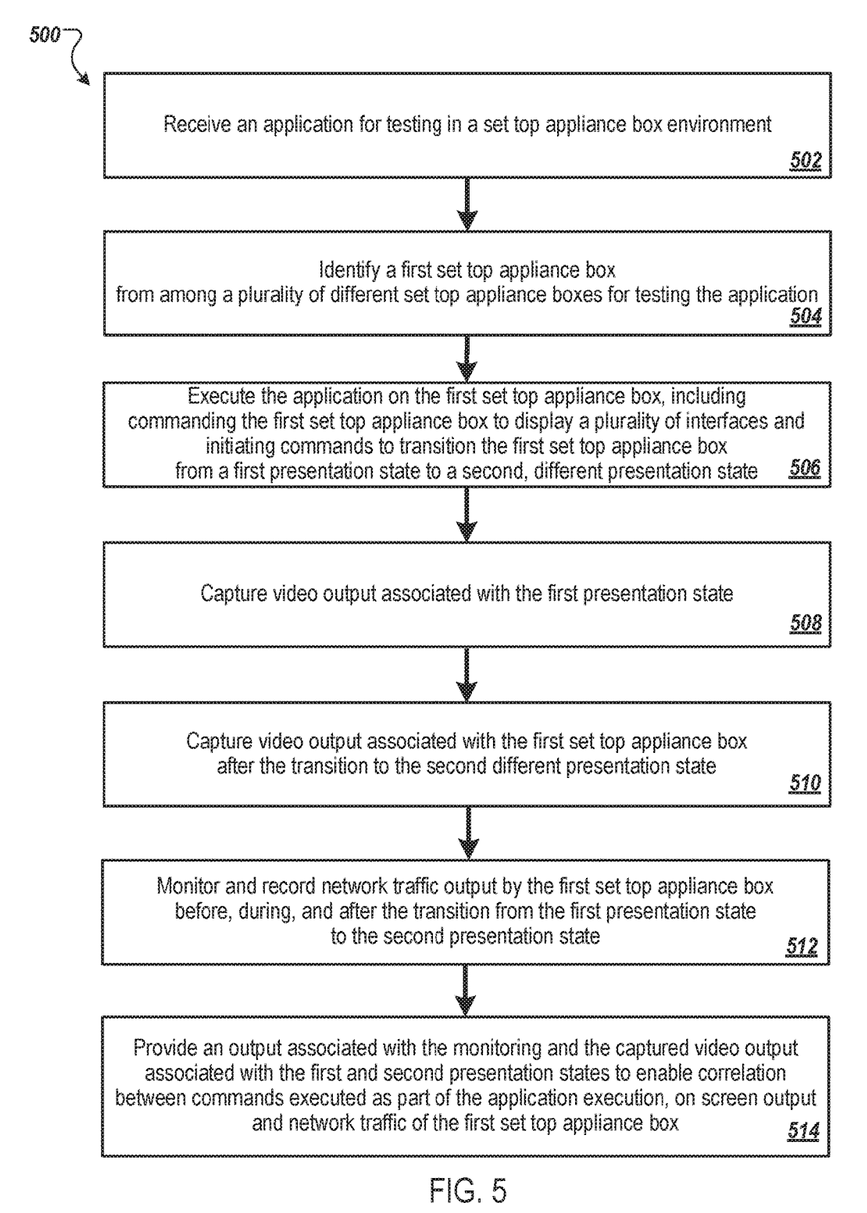
FIG. 5 is a flowchart of an example process for testing a set top appliance box application.

FIG. 5 is a flowchart of an example process 500 for testing an application for execution on a set top appliance box. The process 500 can be performed, for example, by the system 100 described above with respect to FIG. 1.

An application for testing in a set top appliance box environment is received (502).

A first set top appliance box is identified from among a plurality of different set top box appliances for testing the application (504). The set top appliance boxes can include, for example, Apple™ TV, a Roku™ device, a Chromecast™ player, or a Fire™ TV.

The application is loaded and executed on the first set top appliance box (506), including, as part of the executing, commanding the first set top appliance box to display a plurality of interfaces and initiating commands to transition the first set top appliance box from a first presentation state to a second, different presentation state. Commanding can include providing infrared or radio frequency commands to the first set top appliance box to transition from the first presentation state to the second, different presentation state. Executing the application can include receiving a test program associated with the application and translating commands included in the test program into infrared or radio frequency commands that are transmitted to the first test top appliance box for transitioning from the first presentation state to the second different presentation state. The test program instructions can be interpreted. Instructions included in the test program can be executed to test the application executing on the first set top appliance box during operation in the first and second different presentation states.

Video output associated with the first presentation state is captured (508). Video output associated with the first set top appliance box is captured after the transition to the second, different presentation state (510).

Network traffic (associated with the application) output by the first set top appliance box in association with the execution of the application is monitored and recorded, as part of the executing, before, during, and after the transition from the first presentation state to the second presentation state (512). An output associated with the monitoring and the captured video output associated with the first and second presentation states is provided (e.g., to a tester, such as on a dashboard provided by a portal process) to enable correlation between commands executed as part of the application execution, on-screen output, and network traffic of the first set top appliance box (514).

Expected video output for the first set top appliance box can be correlated with captured video output associated with the first set top appliance box. Differences between the expected video output and the captured video output can be identified and reported. Similarly, expected network traffic for the first set top appliance box can be correlated with captured network traffic associated with the first set top appliance box. Differences between the expected network traffic and the captured network traffic can be identified and reported.

Figure 6:
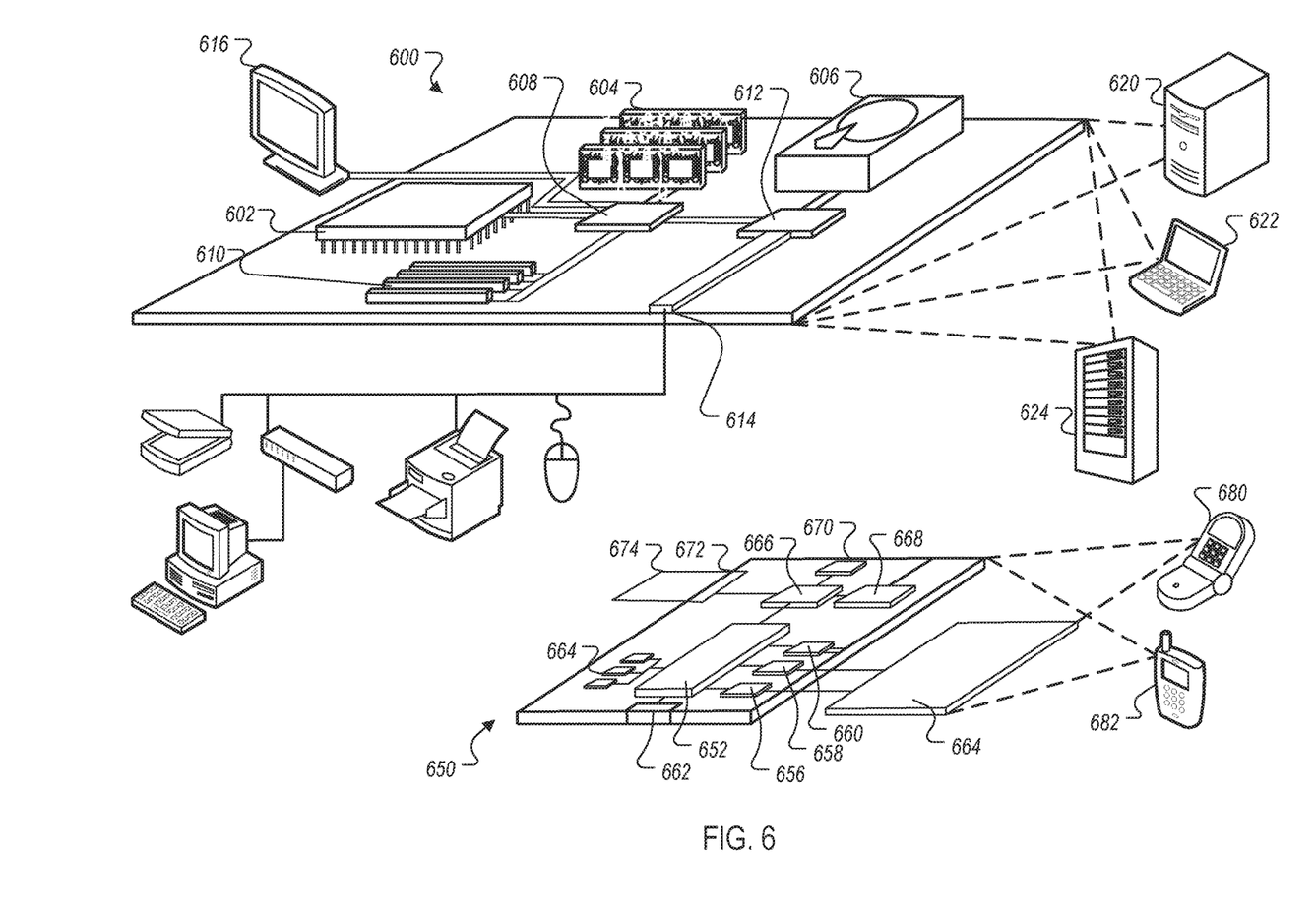
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. The computer-readable medium is not a propagating signal. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   receiving, by a test controller, an application for testing;
   identifying, by the test controller, a first media player from among a plurality of different media players for testing the application;
   executing, by the test controller, the application on the first media player in accordance with a test program;
   commanding, by a harness coupled to both the test controller and the first media player, the first media player to display a plurality of interfaces of an application, including initiating commands to transition from a first video output of the application to a second different video output of the application;
   capturing, by a video recorder coupled to the first media player, the first video output presented prior to the transition;
   capturing, by the video recorder, the second different video output presented after the transition;
   recording, by a proxy, network traffic output by the first media player before, during, and after the transition from the first video output to the second video output;
   determining, by the test controller, whether the network traffic output by the first media player indicates a transition to the second different video output at a time corresponding to the capture of the second different video output; and
   outputting, by the test controller, information specifying whether the network traffic indicated the transition to the second different video output at the time corresponding to the capture of the second different video output.

2. The method of claim 1 wherein the first media player comprises a streaming media player.

3. The method of claim 1 further comprising correlating expected video output for the first media player with the captured second different video output including identifying differences over the expected output and reporting same.

4. The method of claim 1 further comprising correlating expected network traffic with the recorded network traffic including identifying differences over the expected network traffic.

5. The method of claim 1 wherein commanding includes providing infrared or radio frequency commands to the first media player to transition from the first video output to the second different video output.

6. The method of claim 1 wherein commanding comprises receiving a test program associated with the application and interpreting commands included in the test program into infrared or radio frequency commands that are transmitted to the first media player for transitioning from the first video output to the second different video output.

7. The method of claim 6 further comprising interpreting the test program and executing instructions included in the test program to test the first media player during transitioning to the first and second different video outputs.

8. The method of claim 1 wherein the first video output is characterized by an on screen menu and wherein commanding the first media player includes executing instructions to cause selection of an item from the menu to cause a transition from the first video output to the second different video output.

9. The method of claim 8 wherein the second video output is characterized by playing of video content responsive to the selection of the item from the menu.

10. An apparatus comprising:
    a test controller that receives an application for testing, identifies a particular media player from among a plurality of different media players for testing the application, and executes the application on the particular media player in accordance with a test program;
    a first media player operable to execute the application, receive commands associated with portions of the test program, display different interfaces associated with the execution of the application in accordance with the test program, and provide network traffic based on actions performed and commands received at the first media player;
    a harness coupled to both the test controller and the first media player being operable to receive commands from the test controller for controlling the first media player, receive commands associated with the execution of the test program by the test controller, and generate infrared or radio frequency commands for causing the first media player to display a plurality of interfaces and initiate commands to transition the first media player from a first video output of the application to a second different video output of the application;

a video recorder coupled to the first media player and the harness operable to capture video output of the first media player responsive to commands received from the harness including capturing the first and second different video outputs; and a proxy that monitors and stores network traffic output by the first media player in association with the execution of the application before, during, and after the transition from the first video output to the second video output; and wherein the test controller:

determines whether the network traffic output by the first media player includes network traffic indicating a transition to the second different video output at a time corresponding to the capture of the second different video output; and provides an output indicating whether the network traffic indicates the transition to the second different video output at the time corresponding to the capture of the second different video output.

11. The apparatus of claim 10, wherein the test controller correlates expected video output for the first media player with the captured second different video output including identifying differences over the expected output and reporting same.

12. The apparatus of claim 10, wherein the test controller correlates expected network traffic with recorded network traffic including identifying differences over the expected network traffic.

13. The apparatus of claim 10 wherein the harness provides infrared or radio frequency commands to the first media player to transition from the first video output to the second different video output.

14. The apparatus of claim 10 wherein the test controller interprets commands included in the test program into infrared or radio frequency commands that are transmitted to the first media player for transitioning from the first video output to the second different video output.

15. The apparatus of claim 10 wherein the first media player comprises a streaming media player.

16. A non-transitory computer readable medium storing instructions that, when executed by one or more processors, cause the one or more processors to:

receive, by a test controller, an application for testing;

identify, by the test controller, a first media player from among a plurality of different media players for testing the application;

execute, by the test controller, the application on the first media player in accordance with a test program;

command, by a harness coupled to both the test controller and the first media player, the first media player to display a plurality of interfaces of an application, including initiating commands to transition from a first video output of the application to a second different video output of the application;

capture, by a video recorder coupled to the first media player, the first video output presented prior to the transition;

capture, by the video recorder, the second different video output presented after the transition;

record, by a proxy, network traffic output by the first media player before, during, and after the transition from the first video output to the second video output;

determine, by the test controller, whether the network traffic output by the first media player indicates a transition to the second different video output at a time corresponding to the capture of the second different video output; and output, by the test controller, information specifying whether the network traffic indicated the transition to the second different video output at the time corresponding to the capture of the second different video output.

17. The non-transitory computer readable medium of claim 16, further comprising instructions that, when executed by the processor, cause the processor to correlate expected video output for the first media player with the captured second different video output including identifying differences over the expected output and reporting same.

18. The non-transitory computer readable medium of claim 16, comprising instructions that, when executed by the processor, cause the processor to correlate expected network traffic with recorded network traffic including identifying differences over the expected network traffic.

19. The non-transitory computer readable medium of claim 16 wherein commanding includes providing infrared or radio frequency commands to the first media player to transition from the first video output to the second different video output.

20. The non-transitory computer readable medium of claim 16 wherein commanding includes receiving a test program associated with the application and interpreting commands included in the test program into infrared or radio frequency commands that are transmitted to the first media player for transitioning from the first video output to the second different video output.

* * * * *